US012761476B2

(12) United States Patent
Christmas

(10) Patent No.: US 12,761,476 B2
(45) Date of Patent: Oct. 13, 2026

(54) DISPLAY SYSTEM AND METHOD

(71) Applicant: Dualitas Ltd, Milton Keynes (GB)

(72) Inventor: Jamieson Christmas, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 124 days.

(21) Appl. No.: 18/485,793

(22) Filed: Oct. 12, 2023

(65) Prior Publication Data

US 2024/0151968 A1 May 9, 2024

(30) Foreign Application Priority Data

Nov. 4, 2022 (GB) ..................................... 2216436

(51) Int. Cl.
*G02B 27/01* (2006.01)
*G02B 27/10* (2006.01)

(52) U.S. Cl.
CPC ....... *G02B 27/0103* (2013.01); *G02B 27/106* (2013.01); *G02B 2027/0105* (2013.01); *G02B 2027/0109* (2013.01); *G02B 2027/0196* (2013.01); *G02B 2207/123* (2013.01)

(58) Field of Classification Search
CPC ............ G02B 30/52; G02B 2027/0118; G02B 2027/012; G02B 27/0101
See application file for complete search history.

(56) References Cited

U.S. PATENT DOCUMENTS

| | | | | |
|---|---|---|---|---|
| 4,021,945 A * | 5/1977 | Sussman | H04N 3/14 40/448 |
| 6,954,185 B2 * | 10/2005 | Ogino | G02F 1/1323 348/835 |
| 7,182,467 B2 * | 2/2007 | Liu | G02B 5/0284 359/452 |
| 7,868,980 B2 * | 1/2011 | Fukushima | G02F 1/133753 349/129 |
| 8,013,944 B2 * | 9/2011 | Roosendaal | G02B 30/27 349/57 |
| 8,274,554 B2 * | 9/2012 | Nakamura | B60K 35/90 348/51 |

(Continued)

FOREIGN PATENT DOCUMENTS

| | | | | |
|---|---|---|---|---|
| CN | 111443489 A | 7/2020 | |
| DE | 3822222 A1 * | 1/1990 | G02B 27/0018 |

(Continued)

OTHER PUBLICATIONS

Combined Search and Examination Report issued on May 4, 2023 in UK Application GB 2216436.2 (5 pages).

(Continued)

*Primary Examiner* — Christopher Stanford
(74) *Attorney, Agent, or Firm* — McDonnell Boehnen Hulbert & Berghoff LLP

(57) ABSTRACT

A display system comprising an optical combiner. The optical combiner is arranged to form a surface for a first eye-box for a first user and a second eye-box for a second user and is transmissive. The display system further comprises a structure arranged in cooperation with a sub-area of the optical combiner. The structure is or appears substantially transmissive when viewed from the first eye-box and substantially opaque when viewed from the second eye-box.

18 Claims, 8 Drawing Sheets

(56) References Cited

U.S. PATENT DOCUMENTS

| | | | | |
|---|---|---|---|---|
| 8,427,395 | B2 * | 4/2013 | Seder | G01S 13/931 345/7 |
| 10,162,175 | B2 * | 12/2018 | Hardy | G02B 27/14 |
| 10,866,414 | B2 * | 12/2020 | Zhang | B60K 35/10 |
| 11,598,959 | B2 * | 3/2023 | Nam | B60K 35/231 |
| 2008/0084361 | A1 * | 4/2008 | Ueta | G02F 1/1347 345/7 |
| 2009/0002268 | A1 * | 1/2009 | Ueta | B60K 35/26 348/E13.059 |
| 2016/0062114 | A1 | 3/2016 | Amarilio et al. | |
| 2017/0315352 | A1 | 11/2017 | Hardy et al. | |
| 2019/0041797 | A1 | 2/2019 | Christmas et al. | |

FOREIGN PATENT DOCUMENTS

| | | | | |
|---|---|---|---|---|
| EP | 3 832 395 | A1 | 6/2021 | |
| GB | 2406731 | A * | 4/2005 | G09F 9/35 |
| GB | 2428129 | A * | 1/2007 | G03B 35/26 |
| GB | 2 534 151 | A | 7/2016 | |
| GB | 2535316 | A | 8/2016 | |
| GB | 2611405 | B | 4/2023 | |
| KR | 10-2016-0010604 | A | 1/2016 | |
| KR | 10-2019-0014479 | A | 2/2019 | |
| WO | WO-2013128615 | A1 * | 9/2013 | B60K 35/53 |
| WO | WO 2014/1018411 | A1 | 11/2014 | |

OTHER PUBLICATIONS

Extended European Search Report issued on Mar. 13, 2024 in EP 23202440.6 (9 pages).

Draper, Craig et al., "Examining aberrations due to depth of field in holographic pupil replication waveguide systems," Applied Optics, vol. 60, No. 6, pp. 1653-1659 (Feb. 16, 2021) (7 pages).

Examination Report issued on Apr. 11, 2025 in KR 10-2023-0147071 (7 pages).

English translation of Examination Report issued on Apr. 11, 2025 in KR 10-2023-0147071 (7 pages).

* cited by examiner

DISPLAY SYSTEM AND METHOD

CROSS-REFERENCE TO RELATED APPLICATIONS

This application claims priority under 35 U.S.C. § 119 to UK Patent Application GB 2216436.2 titled "Display System and Method," filed on Nov. 4, 2022, and currently pending. The entire contents of GB 2216436.2 are incorporated by reference herein for all purposes.

FIELD

The present disclosure relates to a display system a method of display. More specifically, the present disclosure relates to a display system for displaying a first picture to a first user and a second picture to a second user and a display system for projecting a first hologram to a first user and a second hologram to a second user. Some embodiments relate to a holographic projector, picture generating unit, hologram-to-eye device or head-up display such as a head-up display for an automotive vehicle or head-up display for mobility applications.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display device may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some examples, an image (formed from the displayed diffractive pattern/hologram) is propagated to the eyes. For example, spatially modulated light of an intermediate holographic reconstruction/image formed either in free space or on a screen or other light receiving surface between the display device and the viewer, may be propagated to the viewer.

In embodiments, the image is a real image. In other embodiments, the image is a virtual image that is perceived by a human eye (or eyes). The projection system, or light engine, may thus be configured so that the viewer looks directly at the display device. In such embodiments, light encoded with the hologram is propagated directly to the eye(s) and there is no intermediate holographic reconstruction formed, either in free space or on a screen or other light receiving surface, between the display device and the viewer. In such embodiments, the pupil of the eye may be regarded as being the entrance aperture of the viewing system and the retina of the eye may be regarded as the viewing plane of the viewing system. It is sometimes said that, in this configuration, the lens of the eye performs a hologram-to-image conversion.

That is, the (light of a) diffractive pattern/hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it is possible to consider a plurality of different virtual image points of a virtual image. The distance from a virtual point to the viewer is referred to herein as a virtual image distance, for that virtual image point. Different virtual points may, of course, have different virtual image distances. Individual light rays, within ray bundles associated with each virtual point, may take different respective optical paths to the viewer, via the display device. However, only some parts of the display device, and therefore only some of the rays from one or more virtual points of a virtual image, may be within the user's field of view. In other words, only some of the light rays from some of the virtual points on the virtual image will propagate, via the display device, into the user's eye(s) and thus will be visible to the viewer. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). Embodiments of the present disclosure relate to a configuration in which a hologram of an image is propagated to the human eye rather than the image itself. In other words, the light received by the viewer is modulated according to (or encoded with/by) a hologram of the image. However, other embodiments of the present disclosure may relate to configurations in which the image is propagated to the human eye rather than the hologram—for example, by so called indirect view, in which light of a holographic reconstruction or "replay image" formed on a screen (or even in free space) is propagated to the human eye.

A waveguide is used to expand the field of view and therefore increase the maximum propagation distance over which the full diffractive angle of the display device may be used. Use of a waveguide can also increase the user's eye-box laterally, thus enabling some movement of the eye(s) to occur, whilst still enabling the user to see the image. The waveguide may therefore be referred to as a waveguide pupil expander.

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure relates to non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window—e.g., eye-box or eye motion box for viewing by the viewer. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

In some embodiments, the first pair of opposing surfaces of the waveguide are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram or point cloud hologram. The use of diffraction and a diffractive structure necessitates a display device with a high density of very small pixels (e.g. 1 micrometer)—which, in practice, means a small display device (e.g. 1 cm). In broad terms, the present disclosure describes a solution to a problem of how to provide 2D pupil expansion with a diffracted light field (e.g. diffracted light comprising diverging (not collimated) ray bundles).

In aspects, the display system comprises a display device—such as a pixelated display device, for example a spatial light modulator (SLM) or Liquid Crystal on Silicon (LCoS) SLM—which is arranged to provide or form the diffracted (e.g. diverging) light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted (e.g. diverging) light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated (e.g. rod shaped) and the second waveguide pupil expander may be substantially planar (e.g. rectangular-shaped). The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure (comprising the hologram) are referred to herein as "hologram channels" merely to reflect that they are channels of light encoded by the hologram with image information. It may be said that the light of each channel is in the hologram domain rather than the image or spatial domain. The hologram channels may at least partially overlap (in the hologram domain). In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some arrangements, a plurality of spatially separated hologram channels is formed by intentionally leaving areas of the target image, from which the hologram is calculated, blank or empty (i.e., no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the (special type of) hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

Broadly, a system is disclosed herein that provides pupil expansion for an input light field, wherein the input light field is a diffracted or holographic light field comprising diverging ray bundles. As discussed above, pupil expansion (which may also be referred to as "image replication" or "replication" or "pupil replication") enables the size of the area at/from which a viewer can see an image (or, can receive light of a hologram, which the viewer's eye forms an image) to be increased, by creating one or more replicas of an input light ray (or ray bundle). The pupil expansion can be provided in one or more dimensions. For example, two-dimensional pupil expansion can be provided, with each dimension being substantially orthogonal to the respective other.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffractive or diffracted light may be output by a display device such as a pixelated display device such as a spatial light modulator (SLM) arranged to display a diffractive structure such as a hologram. The diffracted light field may be defined by a "light cone". Thus, the size of the diffracted light field (as defined on a two-dimensional plane) increases with propagation distance from the corresponding diffractive structure (i.e. display device).

The spatial light modulator may be arranged to display a hologram (or a diffractive pattern comprising a hologram). The diffracted or diverging light may comprise light encoded with/by the hologram, as opposed to being light of an image or of a holographic reconstruction. In such embodiments, it can therefore be said that the pupil expander replicates the hologram or forms at least one replica of the hologram, to convey that the light delivered to the viewer is spatially modulated in accordance with a hologram of an image, not the image itself. That is, a diffracted light field is propagated to the viewer.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

The above described systems have particular application as head-up displays (HUD), for example in vehicles and automobiles. There is an increasing demand for technology in vehicles that provides information and entertainment to the occupants of that vehicle. This may include information such as hazard warnings, speed information, speed limit information and vehicle information such as fuel level or vehicle charge status and/or entertainment such as movies, films or even games. Collectively this technology may be referred to as infotainment. Infotainment systems can provide the driver with useful information in a clear way. Infotainment systems may comprise a conventional and/or head-up display for displaying information to the driver. Head-up displays are advantageous because the image projected by the head-up display is received in the driver's field of view in their normal driving position. There is no need for a driver to look down to an instrument cluster or conventional display on the dashboard of the vehicle or e.g. centre console. There is an increasing desire for infotainment systems to entertain the other occupants of the vehicle—i.e. the passengers. If the entertainment is to be displayed while a vehicle is moving, the entertainment should be enjoyed by the passenger only and should not distract the driver.

One option for an infotainment system showing entertainment to a passenger could comprise a conventional display on the passenger side of the vehicle, in the dashboard and (as much as possible) out of the field of view of the driver when the driver is looking at the road. Over extended periods of time, such a viewing position could be uncomfortable for the passenger. Furthermore, the size of the "entertainment" images that would be displayed to the passenger in such a system might need to be relatively small because of the nature of the position of the display and, again, the need to reduce the risk of distracting the driver. Even using a very small screen facing away from the driver, there is a risk of distracting the driver, particularly at night.

Entertainment shown at eye-level of the passenger (as would be the case when using a head-up display) would be much more comfortable for the passenger. But conventional HUD-systems are not feasible for displaying entertainment at least because the entertainment would be projected onto a transparent combiner (e.g. the windscreen or a "pop-up" combiner) such that it would be overlaid onto the real world scene. This is clearly not desirable when watching, for example, a movie or film. It would be preferred for the entertainment to be projected onto a dedicated screen but adding a viewing screen inside the cabin of a vehicle could significantly affect a driver's field of view.

It would be desirable to provide an infotainment system that comprises a means to display information to the driver and entertainment to a passenger in which the entertainment is provided as large, clear images at a comfortable viewing position for the passenger while not distracting the driver and not affecting (e.g. reducing) the driver's field of view. Display systems according to the present disclosure addresses this problem.

In general terms, there is provided a display system comprising a plurality of different eye-boxes including a first eye-box for a first user (e.g. driver) and a second eye-box for a second user (e.g. passenger). The display system may be configured to display a first image to the first user and a second, different, image to the second user. The first image may be a computer-generated image. The second image may also be a computer-generated image. The first image may be visible from the first eye-box and the second image may be visible from the second eye-box. The second image may not be visible from the first eye-box and vice versa such that the first user cannot see the second image and the second user cannot see the first image from the respective eye-box of each user. The display system comprises a viewing screen. The viewing screen appears substantially opaque from the second eye-box and substantially transparent from the first eye-box. The first computer-generated image may be overlaid on a real world scene and visible from the first eye-box. In other words, the first user may receive an augmented reality or mixed reality experience comprising a virtual (first) image overlaid onto the real world. The display system may be said to operate in an AR mode for the first user. The second user may perceive only a second computer-generated image absent light of the real world. This is because the viewing screen may substantially block the light of the real world from being received at the second eye-box. In other words, the second user may receive a non-augmented reality or mixed reality experience. The display system may be said to operate in a non-AR mode for the second user when the viewing screen is arranged to substantially block the light of the real world from the being received at the second eye-box. This may be desirable when the second image is formed as part of movie, film or game. The display system according to this disclosure has particular application in the context of a head-up display (HUD), optionally a vehicle or automotive HUD. In such cases, the first user may be a driver of a vehicle and the second user may be a passenger. Importantly, the display system is advantageously arranged such that the first user's (driver's) view of the real world is not obstructed, in particular by the viewing screen. The viewing screen may appear transparent to the first user. Thus, display system operating in the non-AR mode for the second user, may not obstruct the view for the first user (for which the display system is arranged to operate in the AR mode). The optical system is also advantageously arranged such that a relatively large second image is displayed to the passenger at a comfortable eye-level of the passenger without background light or scene light wherein background light or scene light is light received from the real world. The second image is not visible to the first user because light associated with the second image is not received at the first eye-box.

In a first aspect there is provided a display system. The display system comprises an optical combiner. The optical combiner is arranged to form a (viewing) surface for a first eye-box for a first user and a second eye-box for a second user. The first eye-box is different to the second eye-box. A position or location of the first eye-box may be different to that of the second eye-box. The first eye-box and second eye-box may be non-overlapping. The size and/or shape of the first eye-box may be different to that of the second eye-box. The first eye-box and second eye-box may be substantially coplanar. The first eye-box and second eye-box may be located within the cabin of a vehicle. The surface may be referred to as a viewing surface to indicate that it contributes to formation of at least one viewable image. In some embodiments, the viewing surface is a partially-reflective surface or transflective surface that directs (e.g. reflects) first spatially-modulated light to a first eye-box and second spatially-modulated light to a second eye-box. The viewing surface may be an optical combiner such as a window or vehicle windscreen. As the surface is a surface for both the first eye-box and the second eye-box, the surface may be referred to as a common (viewing) surface. The optical combiner may be partially reflective-partially transmissive.

The display system further comprises a structure. The structure defines a sub-area of the optical combiner. In some embodiments, the structure is arranged in cooperation with the sub-area of the optical combiner. In other embodiments, the structure is integral with or part of the optical combiner. The optical combiner and the structure may be integrally formed The structure may be integrated with the optical combiner such as attached thereto. So, the structure may be a separate feature to the optical combiner in some embodiments. The optical combiner may comprise the optical combiner in other embodiments. The structure may adjoin or abut the optical combiner. For example, the structure may be part of a thin film attached or adhered to the optical combiner. The structure is or appears substantially transmissive when viewed from the first eye-box and is or appears substantially opaque when viewed from the second eye-box. As such, the structure has a different appearance, or optical behaviour, when viewed from the first eye-box than when viewed from the second eye-box. This enables the display system to simultaneously operate in an AR (augmented reality) mode for the first user and a non-AR (non-augmented reality) mode for the second user. This may be without the structure obstructing the view/AR mode experience of the first user. The structure may comprise a first state. The structure may be or appear substantially transmissive when viewed from the first eye-box and substantially opaque when viewed from the second eye-box in the first state. In particular, the sub-area of the structure forms a viewing screen for the second eye-box. The sub-area of the structure does not form a viewing screen for the first eye-box.

The optical combiner itself is transmissive such that light that is not otherwise blocked (for example, by the structure) may pass through the optical combiner and be received at one or more of the eye-boxes. In this way, light from outside of the optical system may be received at one or more of the eye-boxes (after being transmitted through the optical combiner). This may be light of the real world (referred to herein as “background light” or “scene light”). Because the structure is substantially transmissive when viewed from the first eye-box, scene light may be received at the first eye-box that has passed through the said sub-area of the optical combiner. Because the structure is substantially opaque when viewed from the second eye-box, scene light may not be received at the second eye-box and/or pass through the said sub-area of the optical combiner. In other words, the first user may be able to see the real world through the said sub-area of the optical combiner (and structure) from the first eye-box but the second user may not be able to see the real world through the said sub-area of the optical combiner (and structure) from the second eye-box.

The display system may be configured to propagate picture content to one or both of the eye-boxes via the optical combiner. In some embodiments, the display system may be configured to propagate picture content of a first picture to the first eye-box. The display system may be configured such that picture content of the first picture is received at the first eye-box after a reflection off the optical combiner. In some embodiments, the display system may additionally be configured to propagate picture content of a second picture to the second eye-box. The display system may be configured such that image content of the second picture is received at the second eye-box after a reflection off the optical combiner. The second picture may be different to the first picture. The display system may be arranged such that image content of the second picture is not received at the first eye-box and image content of the first picture is not be received at the second eye-box. In this way, the first picture may be visible to the first user from the first eye-box and second picture may be visible to the second user from the second eye-box. However, the second picture may not be visible to the first user from the first eye-box and the first picture may not be visible to the second user from the second eye-box.

The first user may receive both the first picture and scene light from the first eye-box. In other words, the first picture may complement/be added to/be overlaid on scene light of the real world received at the first eye-box such that the first user may receive an augmented reality or mixed reality experience comprising a virtual (first) picture overlaid onto the real world. The second user may receive only a virtual (second) picture absent (that is, without) of scene light that has passed through the said sub-area of the combiner. This is because the viewing screen may block that scene light from being received at the second eye-box. This may be desirable when the second picture is part of a movie, film or game wherein the second user would not want to see the second picture overlaid on the real world.

The structure arranged in co-operation with the sub-area of the optical combiner may be such that the field of view of the real world of the first user (through the optical combiner) is wider than that of the second user. This may be because the structure may block at least a portion of the field of view of the real world for second user through the optical combiner (compared to if the structure were not present) but may not block any of the field of view of the first user through the optical combiner.

The sub-area of the optical combiner that the structure defines may be referred to as a first sub-area. A sub-area of the optical combiner that is not arranged in co-operation with the structure may be referred to as a second sub-area. The first and second sub-areas may fill the optical combiner. In other words, the optical combiner may consist of the first and second sub-areas. The first sub-area may be different to the second sub-area such that at least a portion of the first-sub area is not part of the second sub-area. The first and second sub-areas may not overlap. At least some light that has passed through both the first and second sub-areas of the optical combiner may be received at the first eye-box. Thus, a viewing system at the first eye-box may receive light through the both the first and second sub-areas of the optical combiner. Light that has passed through the first sub-area of the optical combiner may not be received at the second eye-box. Light that has passed through the second sub-area may be received at the second eye-box. Thus, a viewing system at the second eye-box may receive light that has passed through the first sub-area only.

The (first) sub-area may fill at least 20% of the optical combiner, optionally at least 40% of the optical combiner. For example, at least 20% of the area of the optical combiner may be filled by the (first) sub-area, optionally at least 40% of the area of the optical combiner may be filled by the (first) sub-area.

In some embodiments, the display system is or is part of a head-up display (HUD), optionally a vehicle or automotive HUD. In such cases, the first eye-box may be an eye-box arranged or positioned for a driver of the vehicle. The first user may be the driver of the vehicle. The second eye-box may be an eye-box arranged or positioned for a passenger of the vehicle. The second user may be the passenger of the vehicle. The second eye-box may be an eye-box arranged or positioned for a passenger of the vehicle—e.g. sat beside/adjacent to the driver of the vehicle. In such systems, the optical combiner may be a windscreen (or windshield) of the vehicle.

The display system according to the disclosure may provide large, clear images/pictures at a comfortable viewing position for a secondary viewer (e.g. a passenger) and in a way which does not distract the driver and does not adversely affect the driver's field of view. In particular, the second eye-box may be positioned on the windscreen (optical combiner) which may advantageously be at the eye-level of the second user. This may advantageously be a comfortable position from which the second user (passenger) may view the second picture for extended periods of time. Furthermore, the second picture advantageously may not be overlaid on the real world when viewed from the second eye-box because the structure substantially prevents scene light from reaching the second eye-box. This may be particularly advantageous when the second picture is associated with an entertainment function (for example if the second picture is part of a movie, film or game). Furthermore, the second picture viewed from the second eye-box may appear much larger than images provided on conventional displays buried in the dashboard of vehicle. These benefits for the second user (passenger) may be achieved without distracting the first user (driver). The first user (at the first eye-box) may not receive the second picture at all and so the first user (driver) may not be distracted by the second picture. Furthermore, because the structure appears transparent from the first eye-box, the structure does not block the driver's field of view through the optical combiner (windscreen). This is all achieved while the first user (driver) may receive the first picture at eye level. When the first picture is associated with driver information, this means the driver may receive the driver information without looking away from the road. Furthermore, the drive does not have to change focus from a display on the dashboard to the road. This refocusing requires the eye to change of focal length of the lens because of the difference in the distance between the eye and the dashboard vs the distance between the eye and road. Refocusing may takes time and may be a strain particularly on tired eyes.

The first picture may comprise a plurality of first picture components. Each of the plurality of first picture components may appear at different distances from the first eye-box. For example, a first picture component may appear closer to the first eye-box than a second picture component. For example, the first picture component may comprise so-called near-field picture content and the second picture component may comprise so-called far-field picture content. Similarly, the second picture may comprise a plurality of image components. Each of the plurality of second image components may appear at different distances from the second eye-box.

In some embodiments, the first eye-box is spatially separated from the second eye-box. The separation between the first eye-box and the second eye-box may be at least 0.5 metres, optionally at least 0.75 metres, optionally at least 1 metre.

In some embodiments, the structure is arranged such that scene light of the real world is transmittable to the first eye-box via the sub-area of the optical combiner. As described above, the structure (which is substantially transparent when viewed from the first eye-box) may not block scene light of the real world before it reaches the first eye-box. In some embodiments, the structure is arranged such that a real world is not visible from the second eye-box via the sub-area of the optical combiner. As described above, the structure (which is substantially opaque when viewed from the second eye-box) may block scene light of the real world before it reaches the second eye-box.

In some embodiments, the display system further comprises a first holographic projector arranged to direct a first hologram of a first picture to the first eye-box using a reflection off the optical combiner. At least a portion of the first hologram may be delivered to the first eye-box by reflection off the sub-area of the optical combiner. The first holographic projector may comprise one or more first display devices, such as liquid crystal on silicon spatial light modulators, as described above. The first holographic projector may also comprise one or more first waveguides. The one or more first waveguides may be configured to provide pupil expansion in a first direction. In embodiments comprising more than one first waveguides, a primary first waveguide may be arranged to provide pupil expansion in a first direction and a secondary first waveguide may be arranged to provide pupil expansion in a second direction. The second direction may be orthogonal to the first direction. The first holographic projection may further comprise one or more light sources arranged to illuminate the one or more first display devices.

In some embodiments, continuous angular ranges of the (wavefront or complex light field encoded with the) first hologram (in the hologram domain) correspond with continuous spatial areas of the first picture (in the spatial domain). In such embodiments, the structure may be arranged such that an angular sub-range of the (wavefront or complex light field encoded with the) first hologram corresponding with (i.e. intersecting) the position of the structure (which may be on the optical combiner) is (directed to and/or) received at the first eye-box. Said angular sub-range of the first hologram may be transmitted by the structure. Said angular sub-range of the first holographic wavefront/hologram may be reflected to the first eye-box by the optical combiner. Importantly, the angular sub-range of the first holographic wavefront/hologram that corresponds with the position of the structure may not be blocked or absorbed by the structure such that at least some of the light associated with said angular sub-range reaches the first eye-box (e.g. via a partial reflection off the optical combiner). That is, the angular sub-range of the first holographic wavefront/hologram that corresponds with the structure may also be incident upon the sub-area of the optical combiner. At least some of said light may be reflected by the sub-area of the combiner to the first eye-box. There may be a second angular sub-range of the first holographic wavefront/hologram corresponding with a portion (i.e. second sub-area) of the optical combiner which is not in cooperation with the structure.

As described above, a hologram may be formed in such a way as to comprise a plurality of hologram channels (in the hologram domain). There may be an angular range of the hologram associated with each hologram channel. Each hologram channel may correspond with a particular spatial area of the first picture (in the spatial domain) and may correspond with a particular position of the structure such that different channels are projected to different positions on the structure and optical combiner. The angular range of the first hologram corresponding with the position of the structure may comprise one or more hologram channels. Light encoded with said hologram channels may be transmitted by the structure and may be reflected to the first eye-box by the optical combiner.

In some embodiments, a second holographic projector may be arranged to form a holographic reconstruction of a second picture on the sub-area (i.e. on the structure). The structure may function as a screen. The second holographic projector may function as a hologram-to-eye projector. The first holographic projector may not function as a hologram-to-eye projector. The structure may be diffuse or diffusely-scattering. The second holographic projector may comprise one or more second display devices, such as liquid crystal on silicon spatial light modulators, as described above. In other cases, the structure may redirect a second holographic wavefront/hologram of the second picture to the second eye-box. In other words, in these other cases, a holographic reconstruction of the second picture is not formed on the structure and, instead, a holographic wavefront/hologram is delivered to the second eye-box. The second holographic projector may also comprise one or more second waveguides. The one or more second waveguides may be configured to provide pupil expansion in the first direction. In embodiments comprising more than one second waveguides, a primary second waveguide may be arranged to provide pupil expansion in the first direction and a secondary second waveguide may be arranged to provide pupil expansion in the second direction. The second holographic projection may further comprise one or more light sources arranged to illuminate the one or more second display devices.

In hologram-to-eye arrangements, continuous angular ranges of the second holographic wavefront/hologram (in the hologram domain) may correspond with continuous spatial areas of the second picture (in the spatial domain) and the structure is arranged such that an angular range of the second holographic wavefront/hologram corresponding with the position of the structure, are reflected by the structure and/or optical combiner. A full angular range (or angular field of view) of the first holographic wavefront/hologram may be greater than a full angular range (or angular field of view) of the second holographic wavefront/hologram. The full angular range of the second holographic wavefront/hologram may span substantially only the second sub-area of the optical combiner. The full angular range of the first holographic wavefront/hologram may span the second sub-area of the optical combiner and other areas of the optical combiner. The full angular range (e.g. angular field of view) of the first holographic wavefront/hologram in a first dimension (e.g. horizontal direction) may span at least 80% or 90% full size of the optical combiner in the first dimension.

The louvre-array comprises an array of substantially parallel longitudinal slats, each slat having a length (e.g. in the vertical or y-direction), width (or height—e.g. in the horizontal or x-direction) and a thickness (e.g. in the depth or z-direction). The louvres/louvre slats may have fixed positions in the array and may remain static in use. In other arrangements, the louvres/louvre slats may be rotatable—e.g. between a first configuration and second configuration. In some embodiments, the louvres/louvre slats have a uniform thickness. In other embodiments, the louvres/louvre slats vary in thickness, for example the thickness may be tapered along their width from the proximal end/edge to the distal end/edge (relative to the eye-box). The louvre slats may extend longitudinally in a first dimension (e.g. vertical direction), and may be spaced apart in a second dimension (e.g. horizontal direction). The second dimension may be substantially orthogonal to the first dimension. The first and second dimensions may correspond to the (principle or defining) dimensions of the sub area of the optical combiner. The optical combiner may have a non-rectangular and non-planar shape but are substantially rectangular and substantially planar. For example, the optical combiner may be a windscreen or windshield of a vehicle. Such windscreens typically have a non-rectangular and non-planar shape but are substantially rectangular and substantially planar. The first and second dimensions, described above, may not be exactly orthogonal. For example, the first and second dimensions may deviate slightly from orthogonal in embodiments where the optical combiner has a complex curvature. This may result in the separation between adjacent louvres of the louvre-array varying slightly along the length of the louvres in the vertical direction. However, despite this slight variation, the louvres may be described as extending substantially longitudinally in the first (vertical) dimension and may be spaced apart substantially in the second (horizontal) dimension for ease of description.

Each slat/louvre of the louvre-array may comprise a first (minor or smallest) face or surface. The first face may be a face of each louvre defined by the length and the thickness of each louvre. In some embodiments, the plurality of parallel louvres are orientated such that the first face thereof substantially faces the first eye-box. As above, the slats/louvres may be spaced apart in the second (e.g. horizontal) dimension. Advantageously, when the louvres are orientated such that the first face faces the first eye-box, light may be substantially transmitted through the sub-area to the first eye-box—i.e. light encoded with the first hologram may pass through louvre-array. Only a portion of that light may be absorbed by the louvres. Thus, the structure may be described as transparent when viewed from the first eye-box and scene light of real world images may pass through the sub-area of the optical combiner and reach the first eye-box. When the first user is a driver of a vehicle, this may mean that the driver's field of view through the optical combiner is not substantially affected by the presence of the structure. The greater a ratio of louvre separation to louvre thickness, the larger the proportion of scene light will be received at the first eye-box rather than being absorbed by the slats/louvres. Preferably, the louvre separation is at least two times greater than the louvre thickness, optionally at least three, optionally at least four, optionally at least five, optionally at least six, optionally at least seven, optionally at least eight times greater than the louvre thickness.

In order for the first face of each louvre to face the first eye-box, the louvres may be non-parallel. The first face of each louvre may be substantially perpendicular to a straight line from a first portion of the first eye-box to the respective louvre. Thus, the angle of the first face of each louvre may depend on the position of the louvre on the optical combiner. The first portion of the first eye-box may be the centre of the first eye-box. However, it may be acceptable for the louvres of the louvre-array to be orientated parallel to one another when an angle of view of the sub-area of the optical combiner viewed from the first eye-box is relatively small. This may be when the angle of view is less than 45 degrees, optionally less than 30 degrees, optionally less than 25 degrees, optionally less than 20 degrees. In such cases, the first face of each louvre may still be described as substantially facing the first eye-box.

Each slat/louvre of the louvre-array may comprise a second (major or largest) face or surface. The second face may be a face or surface of each louvre defined by the width and the length of each louvre. The plurality of parallel louvres may be orientated such that the second face thereof substantially faces the second eye-box. The second face may be larger than the first face. In some embodiments, the second face is at least three or four times larger than the first face in area. In some embodiments, the second face is perpendicular to the first face.

The louvre-array may be arranged such that, when viewed from the second eye-box, the second faces of the louvres appear to form a substantially continuous surface at the sub-area of optical combiner. In this way, scene light may be advantageously prevented from passing through the optical combiner to reach the second eye-box. In other words, the sub-area of the optical combiner may be substantially opaque when viewed from the second eye-box. In some embodiments, a pitch between adjacent louvres of the louvre structure is such that a distal end/edge of one louvre appears to overlap a proximal end/edge of the adjacent louvre when viewed from the second eye-box. That is, it may appear (from the second eye-box) that a footprint of a first louvre overlaps with a footprint of a second louvre, wherein the first louvre is immediately adjacent the second louvre in the array of louvres.

In some embodiments, the structure comprises a first state and a second state. In the first state, the switchable liquid crystal may be arranged such that the structure is substantially transmissive when viewed from the first eye-box and substantially opaque when viewed from the second eye-box (as described above). In the second state, the switchable liquid crystal may be arranged such that the sub-area of the structure is substantially transmissive when viewed from both the first eye-box and the second eye-box. Thus, unlike in the first state, in the second state scene light of the real world may be received at the second eye-box via the sub-area of the optical combiner. The structure may only form a viewing screen (when viewed from the second eye-box) when the switchable liquid crystal is in the second state. The structure comprising a first state and second state as described may be referred to as switchable. The switchable structure advantageously allows the sub-area to selectably form a viewing screen. This may be particularly advantageous in the context of vehicles when the second user (e.g. passenger) of the vehicle may want to be able to view the real world through the sub-area at some times and to receive second pictures from the display system at other times (while blocking a view of the real world). In some embodiments, the display system comprises a controller. The controller may be arranged to control (e.g. switch) the structure between the first state and the second state.

In embodiments in which the structure comprises a louvre-array, the plurality of parallel louvres of the louvre-array may be moveable for example rotatable. The plurality of parallel louvres of the louvre-array may be moveable (e.g. rotatable) between a first configuration and a second configuration. The first configuration may correspond to the first state of the structure. The second configuration may correspond to the second state of the structure. In the first configuration or state, the plurality of parallel louvres may be orientated such that the first face thereof substantially faces the first eye-box and the second face thereof substantially faces the second eye-box (as described above). In the second configuration or state, the plurality of parallel louvres may be rotated relative to the first state. The plurality of louvres may be orientated such that neither the first face nor the second face thereof substantially faces the first eye-box or the second eye-box. In this way, the structure may not appear to form a continuous surface when viewed from either the first or second eye-box. Scene light of the real world may be transmittable via the structure to either the first or second eye-box. In other words, the structure may appear or be substantially transmissive in the second configuration when viewed from the either the first or second eye-box. An angle of the louvres may be selected that maximises the amount of scene light received at both the first and second eye-boxes.

In other embodiments, the structure comprises a switchable liquid crystal such as polymer-dispersed liquid crystal. The switchable liquid crystal may be switchable between a first state and a second state.

The switchable liquid crystal may comprise polymer-dispersed liquid crystal. The switchable liquid crystal may comprise a plurality of liquid crystal droplets of micrometer or nanometer size embedded in a polymer matrix. In the first state, the liquid crystal may be uniformly aligned to allow light to pass through the structure in a first direction (towards the first eye-box) but not in a second direction (towards the second eye-box). Light travelling in the second direction may be scattered by the liquid crystal. The liquid crystal may be aligned such that the refractive index of the liquid crystal matches that of the polymer in the first direction but not in the second direction. The polymer in the first state may perform analogously to the louvre-array described above.

The controller may be arranged to apply a first voltage to the switchable liquid crystal such that the switchable liquid crystal is in the first state. The controller may be arranged to apply a second voltage to the switchable liquid crystal such that the switchable liquid crystal is in the second state. One of the first and second voltages may be zero volts. In this way, the controller may advantageously select either the first state or second state as desired by applying the first or second voltage to the switchable liquid crystal, respectively. The controller may be configured to switch between the first voltage and second voltage based on an input from the first or second user, for example based on an input on a user interface of the display system by the first or second user.

In some embodiments, the optical combiner is the windscreen (or windshield) of a vehicle.

In some embodiments, the structure is attached to the optical combiner. This may be the case, for example, when the structure comprises a louvre-array. In other embodiments, the structure is integral with the optical combiner. This may be the case, for example, when the structure comprises switchable liquid crystal such as polymer-dispersed liquid crystal. The structure may be adjoined, attached or arranged in cooperation with the optical combiner is any perceivable way.

In a second aspect, there is provided a method of display using an optical combiner arranged to form a viewing surface for a first eye-box for a first user and second eye-box for a second user. The method comprises forming a holographic reconstruction of a second picture on a structure arranged in cooperation with a sub-area of the optical combiner. The optical combiner is transmissive and the structure is substantially transmissive when viewed from the first eye-box and substantially opaque when viewed from the second eye-box such that the sub-area of the structure forms a viewing screen for the second eye-box but not the first eye-box. The method may additionally comprise forming a holographic reconstruction of a first picture on a second sub-area of the optical combiner that is different to the first sub-area.

Feature described in relation to the first aspect may apply equally to the method of the second aspect. For example, the optical combiner may be a windscreen (or windshield) of a vehicle. The first user may be a driver of the vehicle. The second user may be a passenger of the vehicle. The first picture may relate to information intended to be displayed to the driver. The second picture may relate to entertainment intended to be displayed to the passenger. The structure may comprise a louvre-array. Alternatively, the structure may comprise a switchable liquid crystal. When the structure comprises a switchable liquid crystal, the method may comprise the step of switching the switchable liquid crystal into a first state in which the structure is substantially transmissive when viewed from the first eye-box and substantially opaque when viewed from the second eye-box before forming a holographic reconstruction of the second picture. This step may comprise applying a first voltage to the switchable liquid crystal. The method may additionally switching the switchable liquid crystal into a first state in which the structure is substantially transmissive when viewed from the first eye-box and when viewed from the second eye-box. This step may comprise applying a second voltage to the switchable liquid crystal. The second voltage may be different to the first voltage. In the second state, a holographic reconstruction of the second picture may not be formed on the structure. However, the first picture may still be formed on the second sub-area.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 2π) which represents the amount of phase retardation provided by that pixel. For example, a pixel of the spatial light modulator described as having a phase value of π/2 will retard the phase of received light by π/2 radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
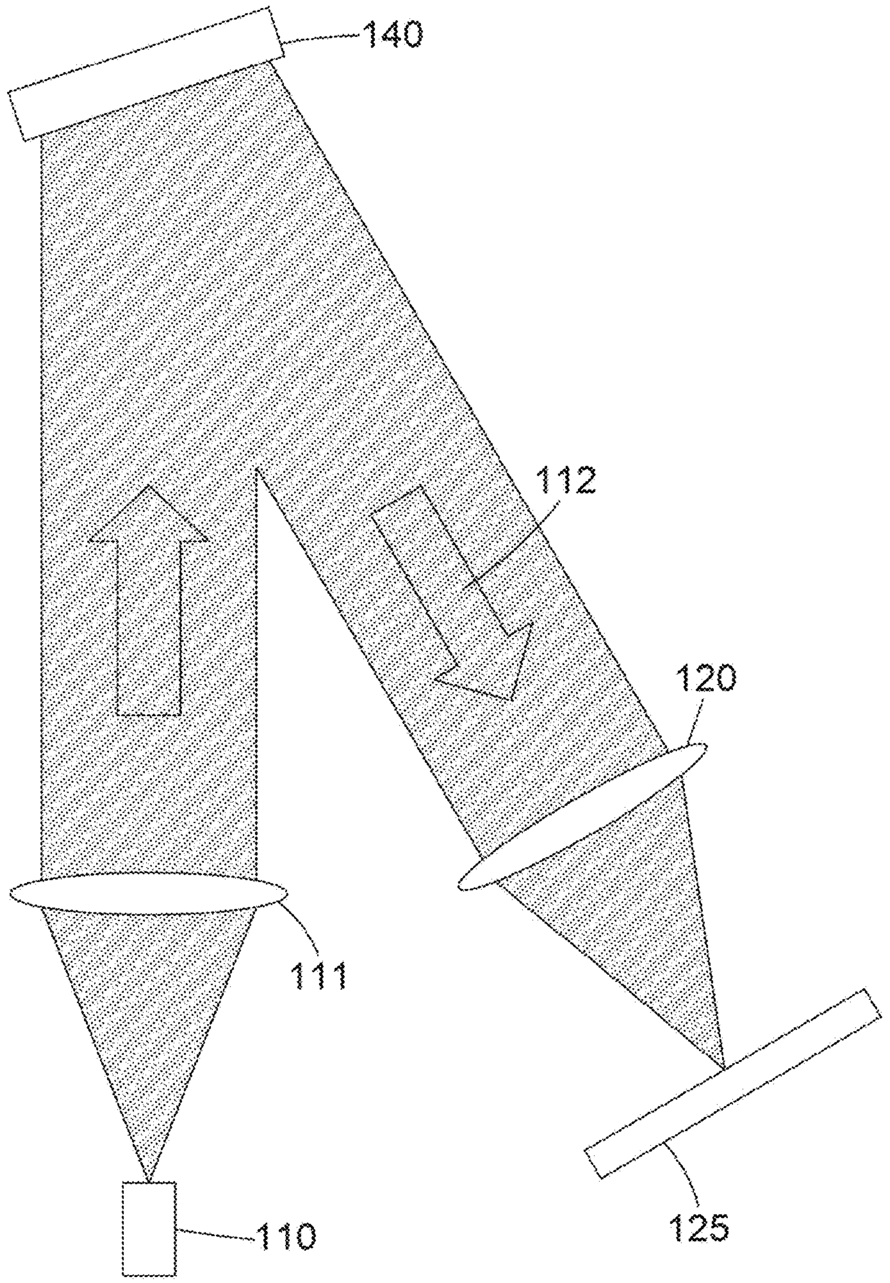
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
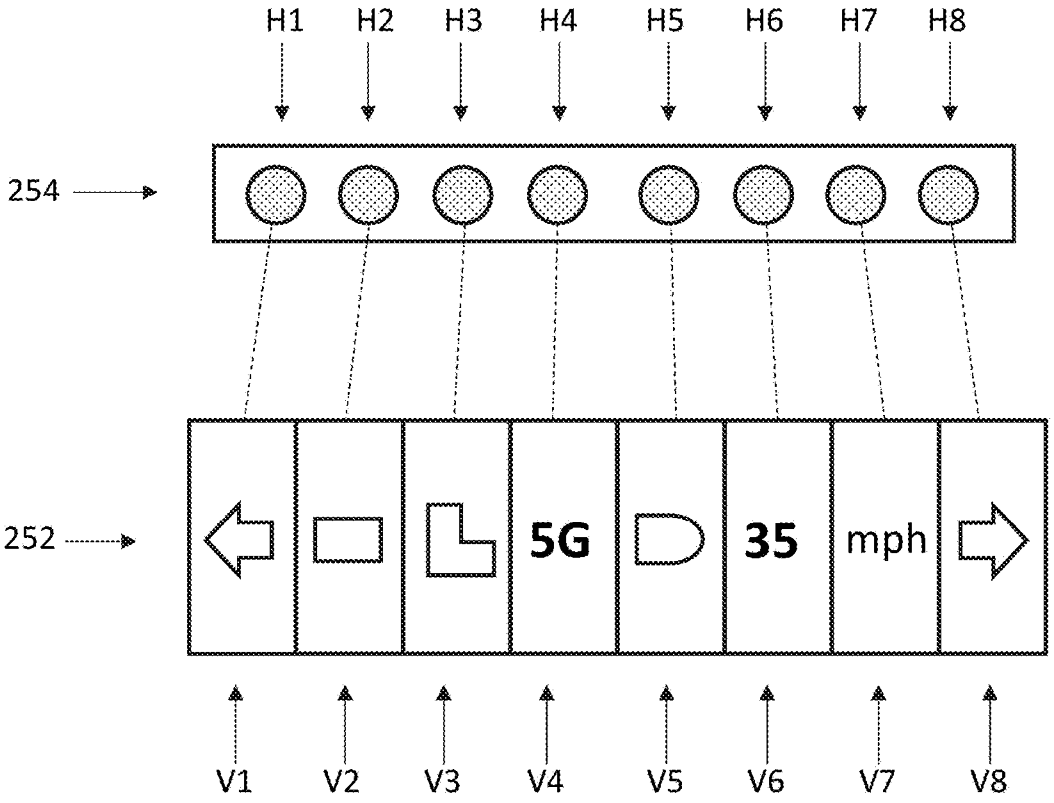
FIG. 2 shows an image for projection comprising eight image areas/components, V1 to V8, and cross-sections of the corresponding hologram channels, H1-H8.
Figure 3:
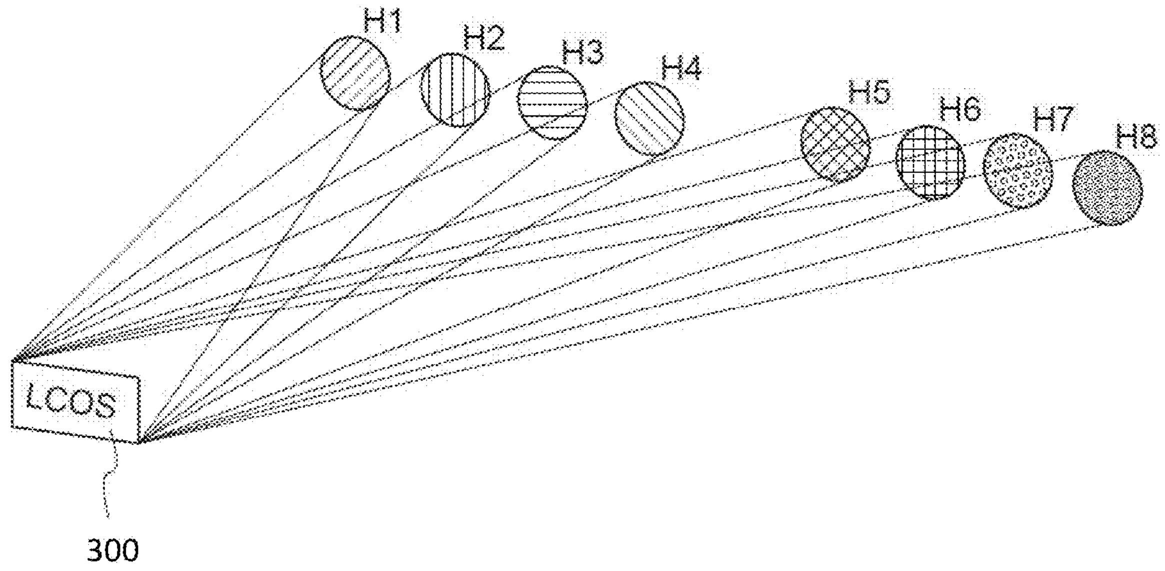
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
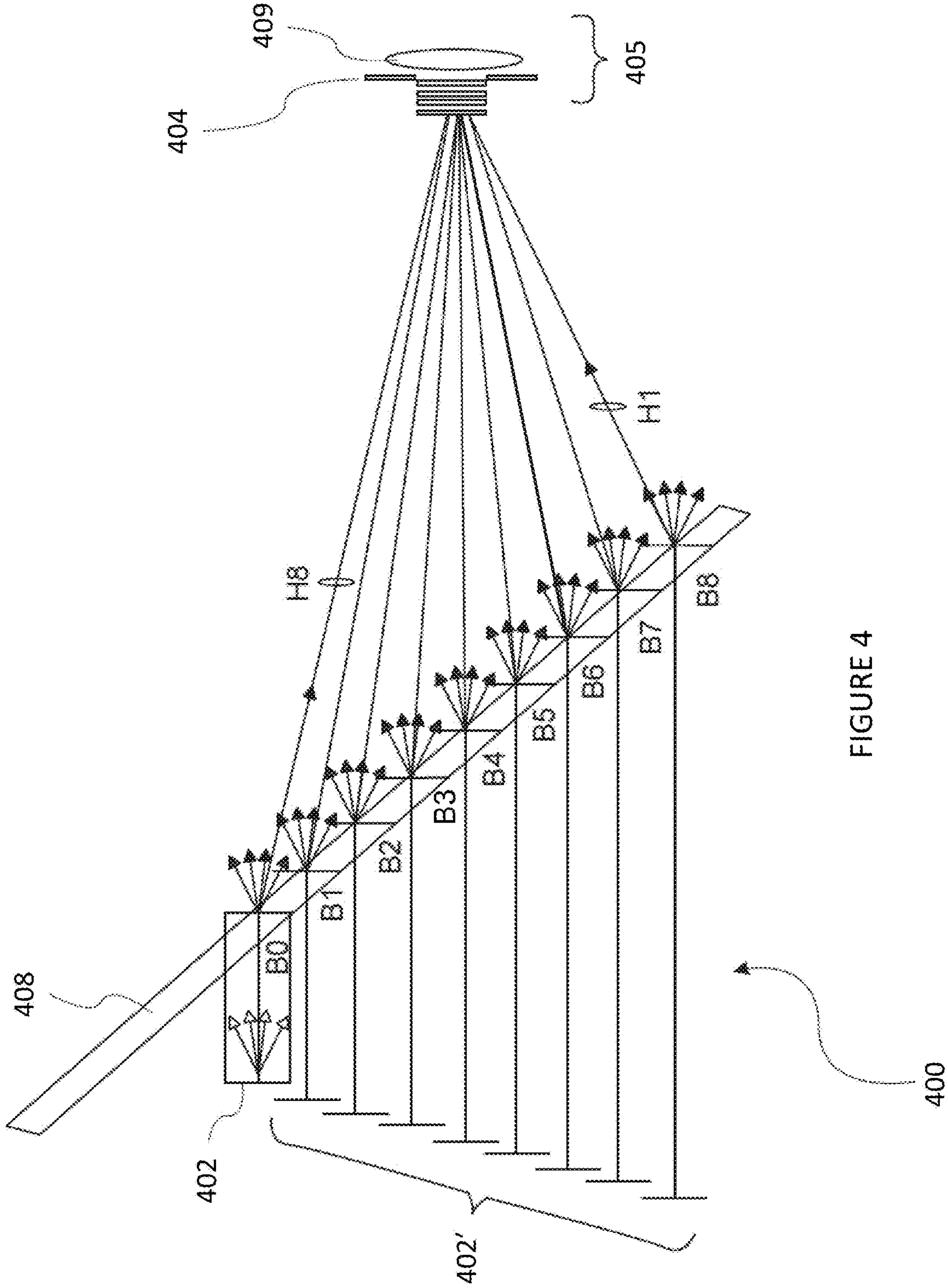
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
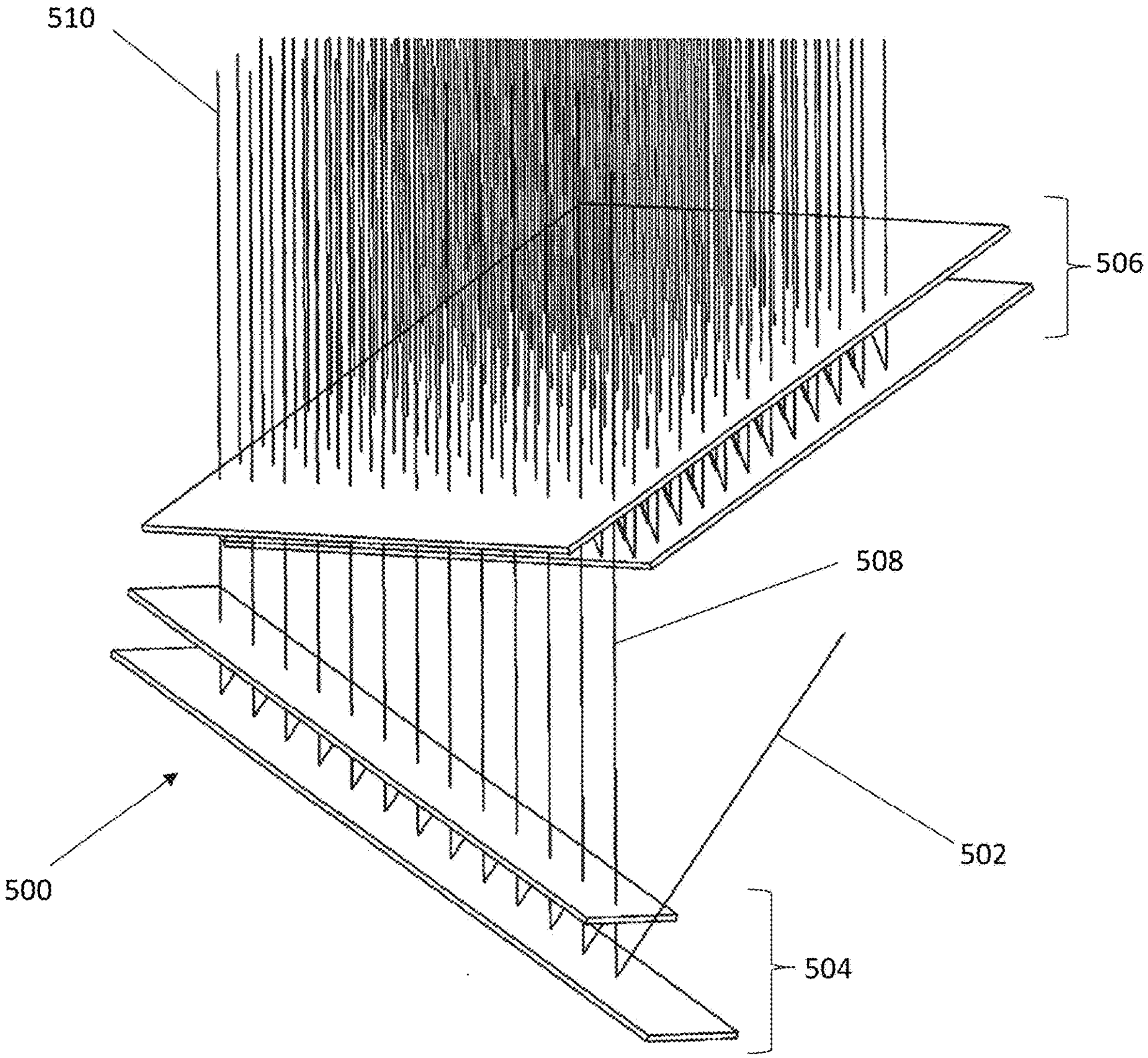
FIGURE 5A PRIOR ART
FIG. 5A shows a system including two replicators arranged for expanding a light beam in two dimensions.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
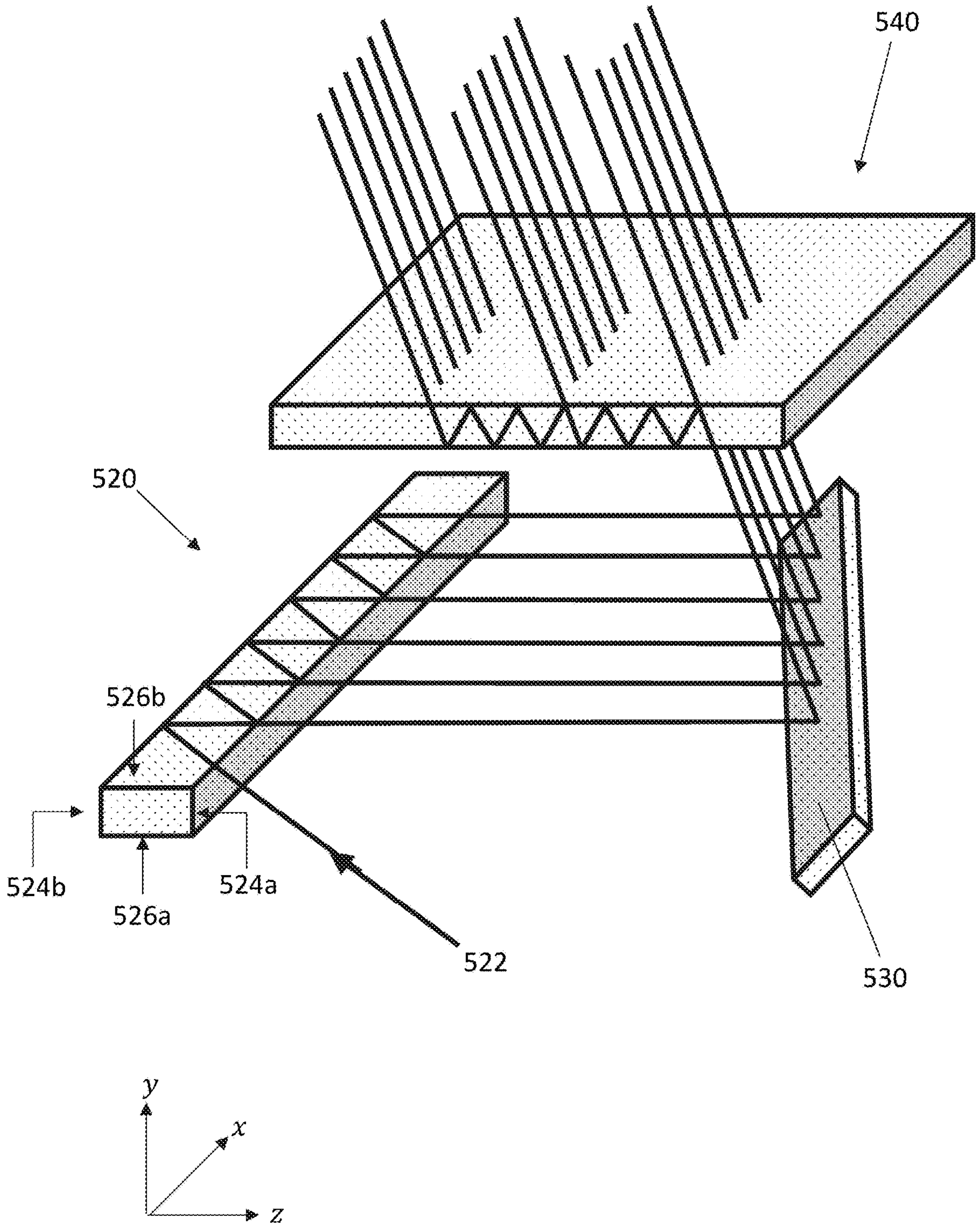
FIG. 5B shows a system including two replicators arranged for replicating a light beam in two dimensions, in which the first replicator is a solid elongated waveguide and the second replicator is a solid planar waveguide.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524*a*, 524*b* are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524*a* of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524*a* of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524*a*. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Improved Infotainment System

Figure 6:
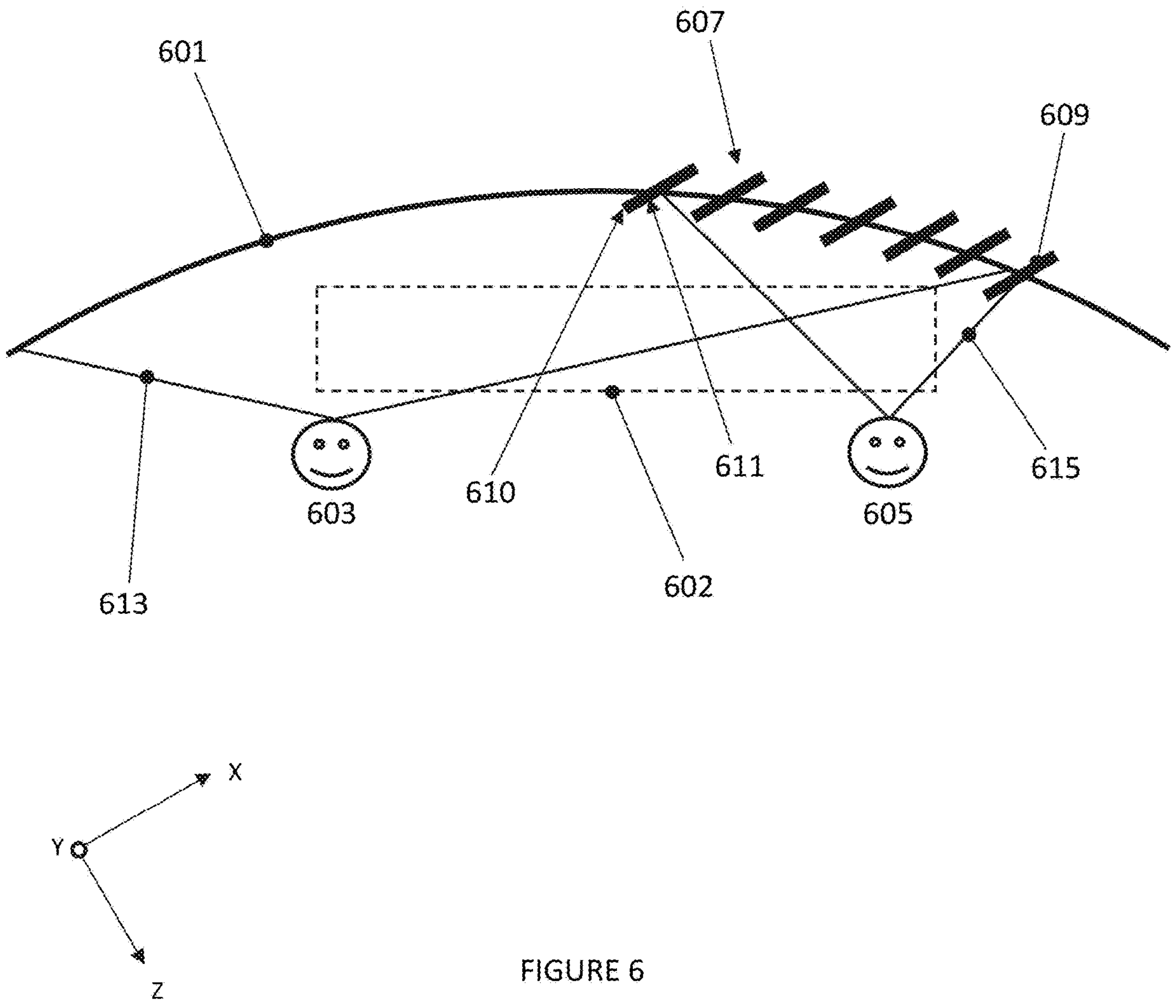
FIG. 6 shows a schematic view of a display system comprising an optical combiner with two users, viewed from above.

FIG. 6 shows a schematic view of a display system comprising an optical combiner with two users, viewed from above. In particular, the display system in FIG. 6 is a head-up display system in a vehicle and the optical combiner is a windscreen 601 of the vehicle. The display system comprises a first holographic projector arranged to direct a first picture to a first eye-box and a second holographic projector arranged to direct a second picture to a second eye-box. The first and second holographic projectors are not shown in detail in FIG. 6. However, a waveguide 602 is represented as a broken line. The waveguide 602 is positioned substantially flat within a dashboard of the vehicle. In some embodiments, the first holographic projector comprises the waveguide 602 and the waveguide 602 is configured to provide expansion of the first eye-box. In such embodiments, the first holographic projector maybe configured to project a hologram to the first eye-box. In some embodiments, the second holographic projector does not comprise a waveguide. The second holographic projector may be configured to provide a virtual image to the second eye-box. In such cases, second holographic projector may comprise a diffuser on which the virtual image is formed. The first and second eye-boxes themselves are not shown in FIG. 6. However, two users are shown in FIG. 6, each user being in a different eye-box.

The vehicle shown in FIG. 6 is left-hand drive. A first user, on the left of FIG. 6, is a driver 603 of the vehicle. The driver's 603 eyes are positioned within the first eye-box. A second user, on the right of FIG. 6, is a passenger 605 of the vehicle. The passenger's 605 eyes are positioned within the second eye-box. The first and second holograms of the first and second pictures are directed from the waveguide 602 to the windscreen 601 and then on to the first and second eye-boxes.

The display system further comprises a structure 607 arranged in cooperation with a sub-area of the windscreen 601. The structure 607 is a louvre-array comprising a plurality of louvres 609 that are, in this example, substantially parallel and spaced apart around the curve of the windscreen. FIG. 6 is not drawn to scale. In most examples, the louvres 609 will be much smaller relative to the optical combiner 601 than suggested by FIG. 6 and the display system typically would comprise a great many more of these smaller louvres. In any case, each louvre extends longitudinally in the Y direction, has a width/height in the X direction and a thickness in the Z direction. A first face 610 of each of the louvres 609 substantially faces towards the driver 603/towards the first eye-box. Each first face 610 is defined by the smallest surface of the louvre. Each first face 610 is defined by the length and the thickness of the louvre in the Y and Z axes respectively. Because the louvre-array 607 spans a relatively small angle of view when viewed from the first eye-box, each first face 610 of the louvre-array 607 can be described as substantially facing the first user 610 even though the individual louvres 609 are exactly parallel to one another. However, as will be clear to the skilled person, in some examples, the louvres may deviate slightly from parallel to ensure that each of the louvres 609 to in fact substantially face towards the driver 603 particularly if the sub-area of the windscreen extends over a larger angle of view. This deviation from parallel may account for the complex curvature of the windscreen. A second face 611 of each of the louvres substantially faces towards the passenger 605/second eye-box. The second face 611 of each louvre is much larger than its first face. The second face 611 of each louvre is defined by the louvres width/height in the X direction and its length in the Y direction.

Scene light of the real world (for example, light that forms an image of the road ahead) can be transmitted through the windscreen 601 from outside of the vehicle. When viewed from the first eye-box (e.g. in the position of the driver 603) scene light is even transmitted through the sub-area of the windscreen 601 in co-operation with the louvre-array 607. This is because the louvres are arranged such that the scene light can pass between spaces between the louvres 609 to the driver's eyes. Thus, the louvre-array 607 on the windscreen 601 is substantially transmissive to scene light of the real world from the point of view of the driver 603 in the first eye-box. However, the louvre array 607 the windscreen 601 is substantially opaque and scene light of the real world cannot pass through the louvre-array 607 to reach the passenger 605 from the point of view of the passenger in the second eye-box. This is because the second (larger) faces 611 of the louvres 609, facing the passenger 605, appear to overlap when viewed from the second eye-box so as to form a continuous surface that blocks the transmission of scene light. This continuous surface may be referred to as a viewing screen and prevents scene light from being transmitted. Light of the second hologram may be reflected off of the second surface 611 of the louvre-array 607 and/or the windscreen 601 to be received at the second eye-box.

Thus, scene light transmitted through the windscreen 601 is combined with light of the first hologram. This combined light field is received at the first eye-box. In this way, the driver 603 receives a mixed reality experience in which the first image of the first hologram is overlaid on an image of the real world. However, at the second eye-box, light of the second hologram is not combined with scene light because the scene light is blocked by the louvre structure 607. So, the passenger 605 does not receive a mixed reality experience.

A total angular range of light encoded with the first hologram that is reflected off of the windscreen 601 towards the driver is represented by feature 613 in FIG. 6. The total angular range of light encoded with the first hologram spans most of the length of the windscreen 601. A total angular range of light encoded with the second hologram that is reflected off of the windscreen 601 towards the passenger is represented by feature 615 in FIG. 6. The total angular range of light encoded with the second hologram spans only with the sub-area of the windscreen arranged in co-operation with the structure 607. FIG. 6 shows how light of the first hologram (represented by 613) is not received by the passenger 605 and light of the second hologram (represented by 615) is not received by the driver 603.

One of the advantages of the display system according to the disclosure is that a relatively large and clear second image can be projected on to the viewing screen formed by the louvre-array 607. Because the windscreen 601 (which the louvre-array 607 is arranged on) is inherently at the eye-level of the passenger, the second image (projected onto the viewing screen which is formed on the windscreen 601) is formed at a position that the passenger 605 can watch without discomfort for extended periods of time. Furthermore, the viewing screen prevents the light of the second hologram from being combined with scene light at the second eye-box. So, the second image is formed without being overlaid on the real world which is clearly advantageous when the second image is, for example, associated with a movie, a film or a game designed to entertain the passenger 605. This is all done without obscuring the field of view of the driver or distracting the driver 605. In particular, the driver is still able to view the real world through the louvre-array 607 and the driver does not receive the "entertainment" of the second image which might otherwise cause distraction.

Figure 7:
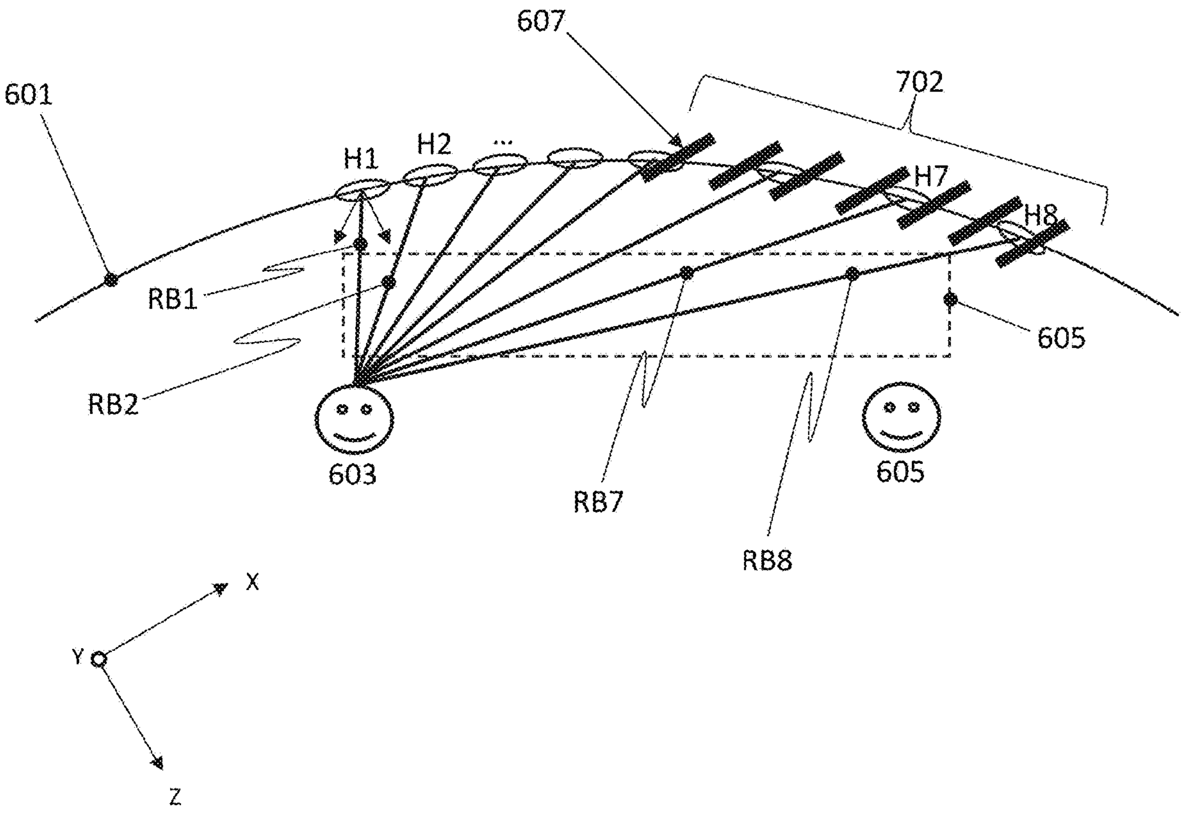
FIG. 7 shows the display system of FIG. 6 in which a channelling hologram is projected on to the optical combiner.

FIG. 7 shows a schematic view of the display system of FIG. 6, but shows in particular how the first hologram can comprise a plurality of hologram channels (as described in relation to FIG. 4) and the paths followed by those channels from the optical combiner to the driver 603 at the first eye-box.

FIG. 7 shows the first to eighth sub-holograms or components, H1 to H8, corresponding to the first to eighth image components/areas, V1 to V8, that were also shown in FIG. 2. FIG. 7 shows how each of the sub-holograms H1 to H8 is incident upon the windscreen 601 at different points, with sub-holograms being distributed sequentially and with H1 being closest to the driver 603 and H8 being furthest from the driver 603. Light is then reflected from the windscreen 601 as a ray bundle. FIG. 7 shows how there is a ray bundle associated with each sub-hologram. In particular, ray bundle RB1 is associated with H1 and RB2 is associated with H2 etc. Each sub-hologram may be referred to as forming an angular range of the first hologram (i.e. H1 forms a first angular range of the first hologram and H2 forms a second angular range of the first hologram). The full angular range of the first hologram comprises each of H1 to H8. It can be said that each sub-hologram has a respective position on the windscreen 601. Some of the sub-holograms have a respective position on the windscreen 601 that corresponds to louvre-array 607. This includes H7 and H8. The angular range 702 (shown in FIG. 7) corresponds with the louvre-array 607. The louvre-array 607 is arranged such that the hologram channels of the angular range 702 (including H7 and H8) are transmitted by the louvre-array 607. In particular, the louvre-array 607 is arranged such that light associated with the sub-holograms is incident on the windscreen 601 between adjacent louvres and is reflected to the driver 603.

A louvre-array structure 607 has been described in relation to FIGS. 6 and 7 is one example of a structure that provides a sub-area that is substantially transmissive when viewed from a first eye-box and substantially opaque when viewed from a second eye-box. Another example of such a structure is a switchable liquid crystal such as polymer-dispersed liquid crystal. In such examples, the switchable liquid crystal is switchable between a first state and a second state. In the first state, the switchable liquid crystal is arranged such that the sub-area of the windscreen is substantially transmissive when viewed from the first eye-box and substantially opaque when viewed from the second eye-box. In the second state, the switchable liquid crystal is arranged such that the sub-area of the windscreen is substantially transmissive when viewed from both the first eye-box and the second eye-box. The switchable liquid crystal advantageously allows the sub-area to selectably form a viewing screen. This may be particularly advantageous is it allows the passenger to be able to view the real world through the sub-area at some times and to receive second images from the display system at other times. In such examples, the display system comprises a controller. The controller is arranged to control the switchable liquid crystal. In particular, the controller is arranged to apply a first voltage to the switchable liquid crystal when the switchable liquid crystal is in the first state. The controller is arranged to apply a second voltage to the switchable liquid crystal when the switchable liquid crystal is in the second state. In this way, the controller advantageously select either the first state or second state as desired by applying the first or second voltage to the switchable liquid crystal, respectively. The controller is configured to switch between the first voltage and second voltage based on an input from the first or second user, for example based on an input on a user interface of the display system by the first or second user.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A display system comprising:

an optical combiner arranged to form a surface for a first eye-box for a first user and a second eye-box for a second user, wherein the optical combiner is substantially transmissive; and a structure defining a sub-area of the optical combiner, wherein the structure of the sub-area of the optical combiner is (i) substantially transmissive when viewed from the first eye-box, thereby enabling the first user to both (i-a) see through the sub-area of the optical combiner and (i-b) view a hologram projected by a first holographic projector, and (ii) substantially opaque when viewed from the second eye-box, thereby enabling the second user to see a holographic reconstruction provided by a second holographic projector, wherein at least a portion of the holographic reconstruction appears in the sub-area of the optical combiner.

2. The display system of claim 1, wherein the first eye-box is spatially separated from the second eye-box, and wherein the first and second eye-box are substantially coplanar.

3. The display system of claim 1, wherein the structure is arranged such that scene light of the real world is transmittable to the first eye-box via the sub-area of the optical combiner.

4. The display system of claim 1, wherein the structure is arranged such that scene light of the real world is substantially not transmittable to the second eye-box via the sub-area of the optical combiner.

5. The display system of claim 1, further comprising the first holographic projector, wherein the first holographic projector is arranged to direct a first hologram of a first picture to the first eye-box using a reflection off the optical combiner.

6. The display system of claim 5, wherein continuous angular ranges of the first hologram correspond with continuous spatial areas of the first picture, and wherein the structure is arranged such that an angular range of the first hologram corresponding with a position of the structure is transmitted through the structure.

7. The display system of claim 1, further comprising the second holographic projector arranged to form a holographic reconstruction of a second picture on the sub-area.

8. The display system of claim 1, wherein the structure comprises a louvre-array, wherein the louvre-array comprises a plurality of parallel louvres.

9. The display system of claim 8, wherein the plurality of parallel louvres are orientated such that a first face thereof substantially faces the first eye-box, wherein a second face thereof substantially faces the second eye-box, and wherein the second face is larger than the first face.

10. The display system of claim 9, wherein the second face is at least between about three to four times larger than the first face in area.

11. The display system of claim 1, wherein the structure comprises a first state and a second state, and wherein the structure is arranged such that (i) in the first state, the structure is substantially transmissive when viewed from the first eye-box and substantially opaque when viewed from the second eye-box, and (ii) in the second state, the structure is substantially transmissive when viewed from both the first eye-box and the second eye-box.

12. The display system of claim 11, wherein the structure comprises switchable liquid crystal, wherein the switchable liquid crystal comprises as polymer-dispersed liquid crystal, and wherein the switchable liquid crystal is switchable between the first state and the second state.

13. The display system of claim 1, wherein the optical combiner is a windscreen of a vehicle.

14. The display system of claim 1, wherein the structure is attached to the optical combiner or integral with or part of the optical combiner.

15. A method of display using an optical combiner arranged to form a viewing surface for a first eye-box for a first user and second eye-box for a second user, wherein the method comprises:

forming a holographic reconstruction of a second picture on a structure arranged in cooperation with a sub-area of the optical combiner; and wherein the optical combiner is transmissive, and wherein the structure is (i) substantially transmissive when viewed from the first eye-box, thereby enabling the first user to both (i-a) see through the structure and (i-b) view a hologram projected by a first holographic projector, and (ii) substantially opaque when viewed from the second eye-box, thereby enabling the second user to see the holographic reconstruction of the second picture, wherein at least a portion of the holographic reconstruction appears on the structure.

16. The method of claim 15, wherein the structure is switchable between a first state and a second state, wherein in the first state, the structure is substantially transmissive when viewed from the first eye-box and substantially opaque when viewed from the second eye-box, wherein in the second state, the structure is substantially transmissive when viewed from both the first eye-box and the second eye-box, and wherein the method comprises at least one of:

switching the structure from the second state to the first state; or switching the structure from the first state to the second state.

17. The method of claim 16, wherein the structure comprises a switchable liquid crystal.

18. The method of claim 17, wherein:

switching the structure from the second state to the first state comprises applying a first voltage to the switchable liquid crystal that causes the switchable liquid crystal to change from the second state to the first state; and switching the structure from the first state to the second state comprises applying a second voltage to the switchable liquid crystal that causes the switchable liquid crystal to change from the first state to the second state.

* * * * *